United States Patent [19]

Frühauf

[11] Patent Number: 4,528,667
[45] Date of Patent: Jul. 9, 1985

[54] SYSTEM FOR THE TRANSMISSION OF INFORMATION MESSAGES

[75] Inventor: Waldemar Frühauf, Nuremberg, Fed. Rep. of Germany

[73] Assignee: Siemens Aktiengesellschaft, Fed. Rep. of Germany

[21] Appl. No.: 485,620

[22] Filed: Apr. 18, 1983

[30] Foreign Application Priority Data

Apr. 22, 1982 [DE] Fed. Rep. of Germany ....... 3215081

[51] Int. Cl.³ .................... G08C 25/00; G06F 11/00
[52] U.S. Cl. .................... 371/55; 340/310 R
[58] Field of Search ............ 371/55, 57, 70; 340/310 R, 310 A

[56] References Cited

U.S. PATENT DOCUMENTS

| | | | |
|---|---|---|---|
| 3,624,603 | 11/1971 | Delcomyn | 371/70 |
| 3,652,988 | 3/1972 | Yamamoto et al. | 371/55 |
| 3,689,886 | 9/1972 | Durkee | 340/310 R |
| 3,978,449 | 8/1976 | Sanders et al. | 371/70 |
| 4,156,866 | 5/1979 | Miller | 371/69 |
| 4,386,436 | 5/1983 | Kocher et al. | 340/310 R |
| 4,429,299 | 1/1984 | Kabat et al. | 340/310 R |

Primary Examiner—Charles E. Atkinson
Attorney, Agent, or Firm—Scully, Scott, Murphy & Presser

[57] ABSTRACT

A house system for the transmission of information messages which are encoded in the form of digital signals wherein a code is selected which facilitates the testing of each information bit, including a central station and a series of substations at which the information messages of the central station are selectively deliverable through the electrical power supply wiring as the transmission path which is utilized by further similar systems. Each substation, due to an erroneously recognized information bit, will terminate the further information evaluation, whereby each of the information messages evidences a selectable subsequence of digital signals which represents a house code which is specific with respect to the applicable house system, which preferably occurs near the beginning of the total sequence of digital signals representing the information message. The central station generates an operating signal when it is transmitting information messages which is received by a monitoring unit. When an information message originating in a neighboring system with the same house code enters into the house system, then the monitoring unit emits a signal, which, due to the lack of the operating signal of its own central station, recognizes this immediately as a foreign (i.e. non-house) information message and emits a signal on the transmission path which causes a code alteration in the incomming information message. The substation which is addressed during the sequence receives this information message containing the code alteration, and consequenty terminates further information evaluation.

19 Claims, 28 Drawing Figures

SYSTEM FOR THE TRANSMISSION OF INFORMATION MESSAGES

BACKGROUND OF THE INVENTION

1. Field of the Invention

The present invention relates to a system for the transmission of information messages which are encoded in the form of digital signals wherein a code is selected which facilitates the testing of each information bit, including a central station and a series of substations at which the information messages of the central station are selectively deliverable through the electrical power supply wiring as the transmission path which is utilized by further similar systems. Each substation, due to an erroneously recognized information bit, will terminate the further information evaluation, whereby each of the information messages evidences a selectable subsequence of digital signals which is specific with respect to the applicable system, which preferably occurs near the beginning of the total sequence of digital signals representing the information message.

2. Discussion of the Prior Art

A system of that type is commercially available and is utilized as a socalled inherently wireless house cable system. This system is designated as "inherently wireless" because, for information transmission between the central station and the substations no separate wiring network is employed, but the phase conductors of the already-installed electrical power supply are used as the transmission path, wherein the supply voltage serves for the synchronization of the central station and the substations. Such a system is designated as a "house wiring system" inasmuch as, while in a building or even only in an apartment electrical appliances are selectively controlled by the substations associated with these appliances from the central station such as, for instance, switched on or off, checked with respect to their condition or, in the case of electrical illuminating members, there can be carried out a dimming procedure. Serving as the addresses or operational commands for the transporting information messages for the substations associated with the individual appliances are carrier frequency transmitted digital signals, in which the carrier frequency is high in comparison with both the supply voltage frequency and the base frequency of the digital signals. The coding of the digital signals is hereby selected so that there is employed a code particularly adapted for the testing of each informational bit. This requirement is fulfilled by a redundant code. Each information message which is employed within the framework of such a specialized system contains in the first section a selectable subsequence of digital signals which is specific to the respective system, which is designated as the "house code". Thereby it becomes possible that, when a number of apartments are present, for example within one building, in each of which there presently is utilized such a system having the same carrier frequency, to preclude the mutual interference of such systems, since each substation of such a system will only respond when the information telegram contains the "house code" selected for that apartment as well as the special address of the substation. Naturally, the same reasoning is also valid for the same types of systems which are located in neighboring buildings.

However, the possibility cannot be excluded that neighbors which utilize such similar kinds of systems will intentionally or inadvertently utilize a "house code" which has already been selected by another neighbor, and to thereby be able to initiate control procedures in the house or in the apartment of the other neighbor. In order to preclude such a foreign or outside interference, it is common to arrange carrier frequency blocks at the electrical meter of each such apartment or building utilizing such a system. Such carrier frequency blocks must be included as added components in such a system and installed by a skilled worker, by means of which there are encountered additional expenses.

SUMMARY OF THE INVENTION

Accordingly, it is an object of the present invention to improve on a system of the above-mentioned type without the utilization of carrier frequency blocks, and to preclude the mutual interference of neighboring systems which employ the same transmission wiring.

The foregoing object is inventively achieved through the following inventive features:

(a) the central station emits an electrical operating signal during the duration of each information message transmitted therefrom, (b) a monitoring unit is provided which has the operating signals transmitted thereto, (c) the monitoring unit contains (aa) a receiving component for the information message connected to the transmission path, (bb) a memory in which there is stored the subsequence of digital signals which is specific to the applicable system, (cc) a comparator device in which the information message is analyzed with regard to the occurrence of the subsequence of digital signals specific to the applicable system, (dd) a transmission component which is also connected to the transmission path which, always upon the occurrence of a subsequence of digital signals which is specific to the applicable system in an incoming information message, without the concurrent presence of the operating signal, emits a signal altering the code in the information message.

Employed hereby is the property of the substations that on the basis of a testing of each information bit for the applicable specialized code, will terminate the further information evaluation at an erroneously recognized information bit, and fall back into a passive condition. When an information message originating in a neighboring system with the same "house code", enters into the considered system, then the monitoring unit will emit a signal, which, due to the lack of the operating signal of its own central station recognizes this immediately as a foreign information message and emits a signal on the transmission path which occasions a code alteration in the incoming information message. The actual substation which is addressed during the sequence now receives this information message containing this code alteration, and, as a result, immediately terminates any further activity. Due to the absence of carrier frequency blocks, this information message which is subjected to the code alteration is also present in the transmission path of the foreign system, so that the user of the foreign system is not forced by the non-response of his own addressed substation to undertake any change in the selected "house code". The effectiveness of the monitoring unit is not limited to systems with carrier frequency information messages. The receiving component provided in the monitoring unit can be constructed in the same manner as that employed in the substations. In the same manner, the transmission component contained in a monitoring unit can be constructed in the same manner as the transmission component contained in the central station. Since the monitoring unit, due to the operating signal required thereby, is generally located in the vicinity of to the central station or may even be integrated therein, operational elements of the central stations can be concurrently used by the monitoring unit. This is, for example, valid for the transmission component or also the memory in which there is stored the subsequence of digital signals (house code) specific to the applicable system.

In a preferred embodiment of the system, the information messages are transmitted as digital signals which modulate a carrier frequency. Thereby, with a limited demand, there can be transmitted also relatively long digital signals. A satisfactory frequency with respect to the power supply properties as well as the present conditions lies hereby at 90 kHz.

Preferably, for testing the code applicable to each information bit, there is selected a biphase code in which there is repeated a logic value in inverted form associated with an information bit. Thereby, each digital signal representative of the logic value of "1" forcibly repeated by digital signal representative of the logic value "0". This is analogously applicable for a value representative of the logic value "0". Thus, when during the transmission of an information bit there occurs a sequence of two digital signals representative of the logic value "1" or, respectively, the logic value "0", then a code alteration is present which can infer a transmission error and which inactivates the substations.

In the preferred embodiment each information bit of the information message is emitted in the region of a zero crossing passage of the supply voltage. Thereby, the information bits representing digital signals are essentially understood by impedance breakdowns or disturbances which are occasioned, for example, by the current peaks of the charge capacitors of the network components, which are components of the electrical appliances connected to the electrical power supply. It is advantageous when a digital signal which represents a logic value is formed as a sinusoidal wave train. Such a carrier frequency sinusoidal wave train does not subject the transmission path to the higher harmonics of the carrier frequency.

In a preferred embodiment, the subsequence of digital signals which is specific to the applicable system is present at the beginning of the information message. Hereby, the specific subsequence of digital signals which is representative of the "house code", within the frame of the information message, stands available quite early for evaluation in monitoring unit, so that for the evaluation and the emission of a signal effecting a code alteration, there can be employed a further time frame.

It is advantageous when the receiving component encompasses a selective receiver correlated with the carrier frequency, as well as a demodulator. By means of the selectivity of the receiver, this will lead during the carrier frequency transmission of digital signals to a desired lessening of disruptive signals. The demodulator reproduces the digital signals which represent the modulation of the carrier frequency.

The comparator device can include an electronic message memory for at least the subsequence of digital signals specific to the applicable system, whose input is connected to the output of the demodulator and whose output is connected to the one input of an electronic comparator, to which there is connected the second input of the memory. The electronic messages memory serves heretofore at least for the receipt of the subsequence of digital signals which are specific to the applicable system, which represent the "house code", for example, in a biphase code. The memory which, in addition thereto, is present in the monitoring unit also contains as a standard value of memory the subsequence of digital signals which is specific to the applicable system, the "house code", for example, also in a biphase code. The electronic comparator which is connected with the two memories then produces an output when a coincidence is present.

In a particularly simple and inexpensive embodiment, the message memory is constructed as a shift register. Through the entry of the subsequence of digital signals which are specific to the applicable system, the "house code", the synchronized pulse of the shift register is stored for at least the time interval of the subsequent evaluation in the monitoring unit, so that it stands available stored for comparison with the content of the memory which is preferably provided as a standard value memory.

In a preferred embodiment, the output signal of the comparator, as well as the inverted operating signal, are conjunctively interconnected in operative relationship with the trigger input of the transmitting component which, after triggering at the time point of the occurrence of the subsequent information bit, emits a sinusoidal carrier frequency, wave train whose duration corresponds at least to the duration of an information bit in the biphase code. The conjunctive interconnection can be effected through an AND gate. Through the measurement of the minimum duration of the sinusoidal wave train emitted from the transmitting component, it is ensured that, when the logic value "0" is present in the biphase code, which usually corresponds to a gap in the sinusoidal wave train, it is filled in by the sinusoidal wave train so that there always occurs the logic value sequence "1"—"1" which is prohibited in the biphase code. This code alteration is recognized in the substations and immediately leads to the termination of the further evaluation of an incident information message.

A biphase decoder can be connected to the output of the receiver component, the output signal of which is conducted to the input of the message memory. The biphase decoder effects the reconversion of the individual information bits of an information message which are encoded in the biphase code into the redundant-free binary code. The message memory can, in this instance, be designed smaller since it need not store the redundant information presently in inverted form in biphase code. Hereby, the memory which is already contained in the monitoring unit, which continuously contains the subsequence of digital signals ("house code") specific to the applicable system, can be designed as a smaller memory bit.

In a particularly simple construction, the biphase decoder is constructed as a two-stage shift register consisting of two flip flops in which the flip flops are preferably D-flip flops. The pulsing of these flip flops, also the other pulse-requiring functional components of the monitoring-unit, is effected through a voltage supply-synchronized pulse supply circuit, wherein a phase detector, a loop filter, a voltage-controlled oscillator and a frequency divider chain will together form a PLL bit, from the individual frequencies of which, through corresponding logic interconnections, there can be obtained the individual pulse patterns without difficulty.

A preferred embodiment of the invention consists of in the provision of a biphase code tester, which is at its input in operative connection with the biphase decoder and at its output, upon occurrence of a code alteration, in the information message, delivers a resetting signal for a message counter, whereby the message counter determines by its count the input of the subsequence of digital signals specific to the applicable system, and wherein for the content of the message counter, there is provided an interrogating element whose output signal, in accordance with the complete input of the subsequence of digital signals specific to the applicable system, is presently active without code alteration, and wherein the output signal of the interrogating element, together with the output signal of the comparator and the inverted operating signal, are conjunctively interconnected by an AND gate. Since prior to the actual commencement of an information message, there is usually transmitted a code altering signal as a socalled starting pulse, the biphase code tester resets the message counter to zero. The message counter thereafter follows the input of the subsequence of digital signals ("house code") specific to the applicable system and, as long as no code alterations occur in the "house code", after the input of the complete "house code" through the interrogating element, delivers a signal which when the presently incoming information message coincides with the "house code" present in the memory, and when this information message does not originate from its own central station, finally sets into operation the transmitting component for the emission of a pulse pattern which is prohibited in the biphase code.

Connected to the output of the AND gate is preferably a monostable flip flop, whose unstable condition after the setting continues at least to the completion of the subsequent information bit in the information message. The monostable flip flop ensures that at least the information bit of the information message which is subsequent to the "house code" can be rewritten, when required, through a code altering "double one" by the transmitting component. Hereby, within the electrical power supply there is present only one more information message which is subject to a code alteration so that the further evaluation is denied by all substations.

Particularly for the instance in which the individual information bits of an information message are transmitted in timed synchronization with the zero passages of the alternating voltage, it is advantageous when the output signal of the monostable flip flop is conjunctively interengaged by a further AND gate with a signal which is active exclusively in the region of the zero passages of the power supply alternating current for the duration of an information bit, such that the output signal of the further AND gate places the transmitting component into operation. Achieved hereby is that, precisely for duration of the information bit subsequent to the "house code", which is offset by a one-half supply period with respect to the information bit belonging to the "house code", there is inserted a continuous signal from the transmitting component into the presently available information message in the form of a code altering "double one".

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
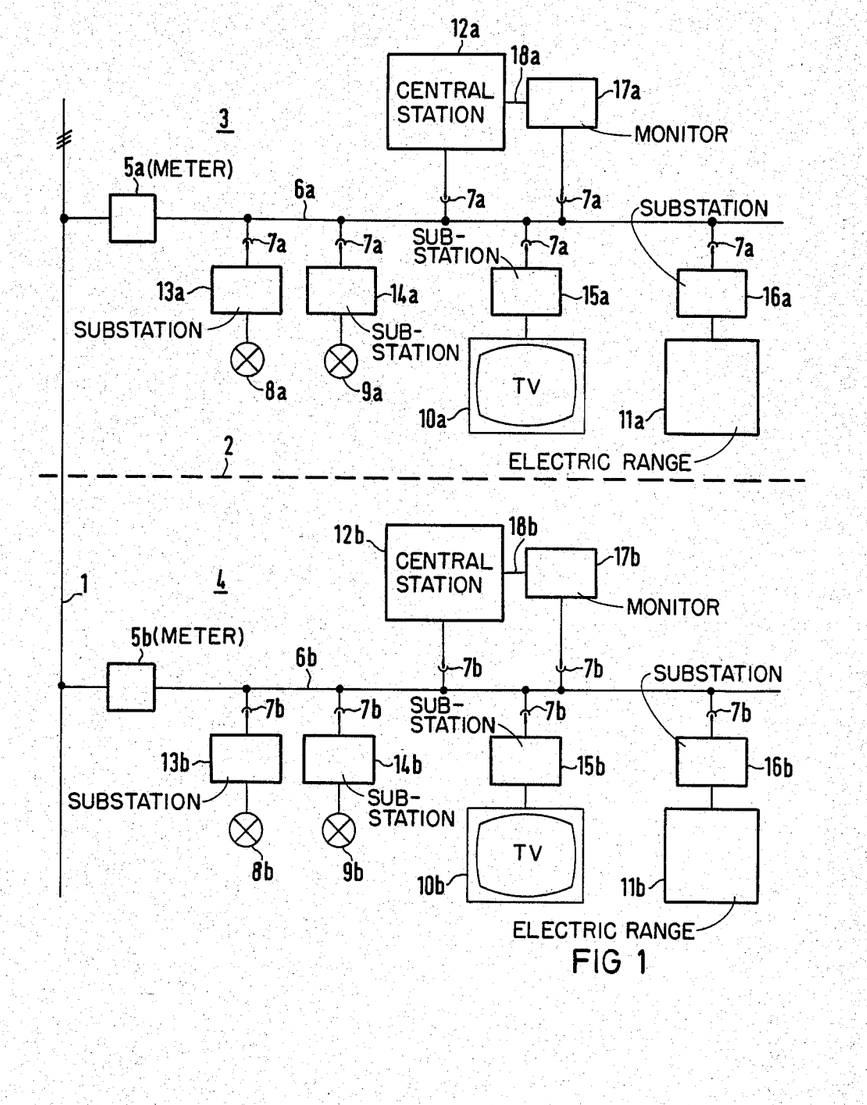
FIG. 1 illustrates a configuration of two similar neighboring systems within a building, in a schematic block diagram.

In FIG. 1 of the drawings, reference numeral 1 designates the supply wiring of the electrical power supply network installed in a house. The phantom line 2 symbolizes the separation between two apartments 3 and 4. The apartments 3 and 4 are equipped with a corresponding electrical installation and corresponding or identical electrical appliances, so that it is sufficient to describe in detail the installation as well as the electrical appliances of only the apartment 3. The corresponding appliances in the two apartments 3 and 4 are distinguished from each other through the appendices a or respectively b after the reference numerals.

Through the electrical meter 5a, there is supplied the electrical power supply network 6a which is installed in the apartment 3. The connection of the electrical appliances in the apartment 3 is effected through the terminal or plug boxes 7a. Serving as electrical appliances in the apartment 3 are, for example, the two lights 8a and 9a, the television set 10a, and also the electric cooking range 11a.

The electrical power supply 6a which is present in the apartment 3 is connected through the terminal box 7a to the central station of the present inventive system. The electrical appliances 8a through 11a are coupled through the interconnection of constructionally identical substations 13a through 16a across the terminal boxes 7a to the electrical power supply 6a. As a transmission path for the information messages between the central station 12a and to the substations 13a to 16a, there serves at least one phase conductor of the installed electrical supply wiring, however preferably the terminal boxes are connected to all three phase conductors, whereby the information messages can be also stored and taken off from the terminal boxes 7a which are connected with suitable phase conductors. Through the substations 13a through 16a, there can be activated or disconnected the attached electrical appliances 8a through 11a, and in the case of the lights 8a and 9a, there can also be effected dimming procedures.

The information messages are present in the form of digital signals modulated by a carrier frequency in the transmission path, whereby each individual information bit of each information message is keyed to a code affording the testing of each of these information bits. A biphase code is utilized which is described in detail hereinbelow. Each of the substations 13a through 16a contains a code test circuit which, upon the occurrence of a code alteration in an information message, causes the immediate cessation of execution of the coded message by the addressed substation.

With heretofore known systems, it is usual that in each apartment, for example in the apartment 3, there is connected at at the output of the electric meter 5a a carrier frequency block, before the apartment, so that information messages employed in the system utilized within the scope of the apartment remain restricted to the particular apartment. The installation of such carrier frequency blocks, however, presents an additional requirement which is eliminated by the present invention.

For this purpose, a monitoring unit is provided in connection with each system, which in the apartment 3 is designated with reference numeral 17a. This monitoring unit 17a is connected, on the one hand, through the terminal box 7a to the electrical supply 6a installed in the apartment 3, and, on the other hand, through the conductor 18a with the central station 12a, whereby the conductor 18a conveys the operating signal of the central station 12a which is active as long as the central station 12a, supplies an information messages to the electrical supply 6a.

Since the configuration illustrated in FIG. 1 does not provide carrier frequency blocks, such information messages in the immediate vicinity of the apartment in which the inventive system is introduced, can leave and can also be present in the installed electrical supply wiring of neighboring apartments or buildings. This does not present any difficulties, for example, as long as the central station 12a in its information message evidences a selectable subsequence of digital signals, the "house code" which is specific to the system of the apartment 3, which distinguishes from the system selected, for example for the apartment 4. Because the substations 13a through 16a, besides the special address of the substation, also have stored therein the subsequence of digital signals, the "house code", which is specific to the system for the apartment 3, each of the substations will respond only when the incoming information messages is provided with the "house code". However, if the inhabitant of apartment 4 inadvertently or intentionally selects for the central station 12b an information message with the same "house code" present in the apartment 3, when the information message is provided with an address of the substations 13a through 16a coinciding with those of apartment 3, he can then undertake from apartment 4 the remote control of the electrical apparatus in the neighboring apartment 3, if a monitoring unit 17a is not provided. This is precluded by the present inventive system.

The mode of operation of the monitoring unit 17a is now explained in detail hereinbelow, with respect to the signals illustrated in FIGS. 2 through 7, for the example in which an information message is presented on the electrical supply network 6a in the apartment 3, which originates from the central station 12a intrinsic to the apartment and which is intended for one of the substations 13a through 16a provided in this apartment 3.

A control sequence for one of the substations 13a through 16a encompasses two sequential information messages, whereby through the first information message the respective substation is addressed and through the subsequent, second information telegram, there is transmitted an operational command, for example an activating or deactivating command for the addressed substation.

Figure 2:
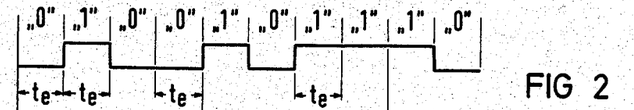
FIGS. 2 through 7 illustrate, on the basis of pulse messages, the operation of the monitoring unit, which emits a pulse message in the central station associated with its own system.

FIG. 2 illustrates an example of an information message generated in the central station 12a which is in a nonredundant binary code. Provided hereby is a sequence of binary signs or digital signals with the logic values "0" or respectively "1", and in which the duration of each of the digital signals is $t_e$. The part sequence of digital signals which is selected specifically for the system acting in the apartment 3, the "house code", consists in the case of FIG. 2 of a sequence of four digitals signals with the total duration $t_H$ and the logic sign sequence "0"—"1"—"0"—"0" at the beginning of the information message. This subsequent sequence of digital signals can represent the address of one of the substations 13a through 16a or can also serve as an operational command after the previously effected addressing of one of these substations. In addition thereto, it may be pointed out here that for reasons of improved clarity, the simplified illustrated information message evidences also ahead of the sign sequence which represents the "house code", a starting pulse sequence characterizing the beginning of the message.

Figure 3:
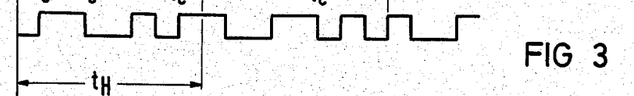

FIG. 3 illustrates the formation of the sequence of digital signals which, after recoding of the originating signal represented in FIG. 2, is present in the biphase code. It is readily ascertainable that the first information bit "0" of the information message illustrated in FIG. 2 now appears in the biphase code as the sign sequence "0"—"1". Quite analogously there appears the second information bit "1" of the information message FIG. 2 in the biphase code in FIG. 3 as the sign sequence "1"—"0". The substations 13a through 16a, as previously mentioned, are equipped with a code test circuit which renders recognizable the alteration of the biphase code. Such an alteration, for example, is present when during the time period $t_e$ for an information bit in the nonredundant binary code (FIG. 2) there appear two digital signals which represent a logic value "1", or two representing the logic value "0" in the binary code.

Figures 4, 5, 6:
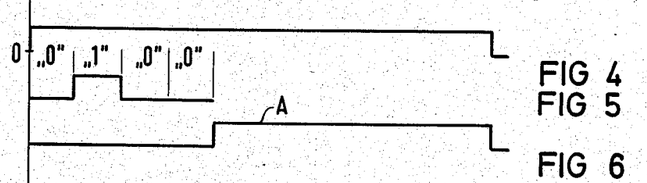
Figure 7:
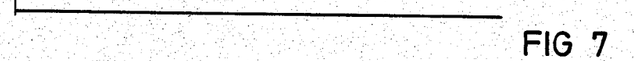

FIG. 4 illustrates the operating signal which, since the central station 12a should be active, is conducted from the central station 12a through the conductor 18a to the monitoring unit. It is noted that the monitoring unit 17a need not necessarily be constructed as a separate unit but can be an integral component of the central station 12a.

FIG. 5 again illustrates the "house code" for the apartment 3, which is stored in a memory, preferably as a reference value of the monitoring unit 17a.

Figure 16:
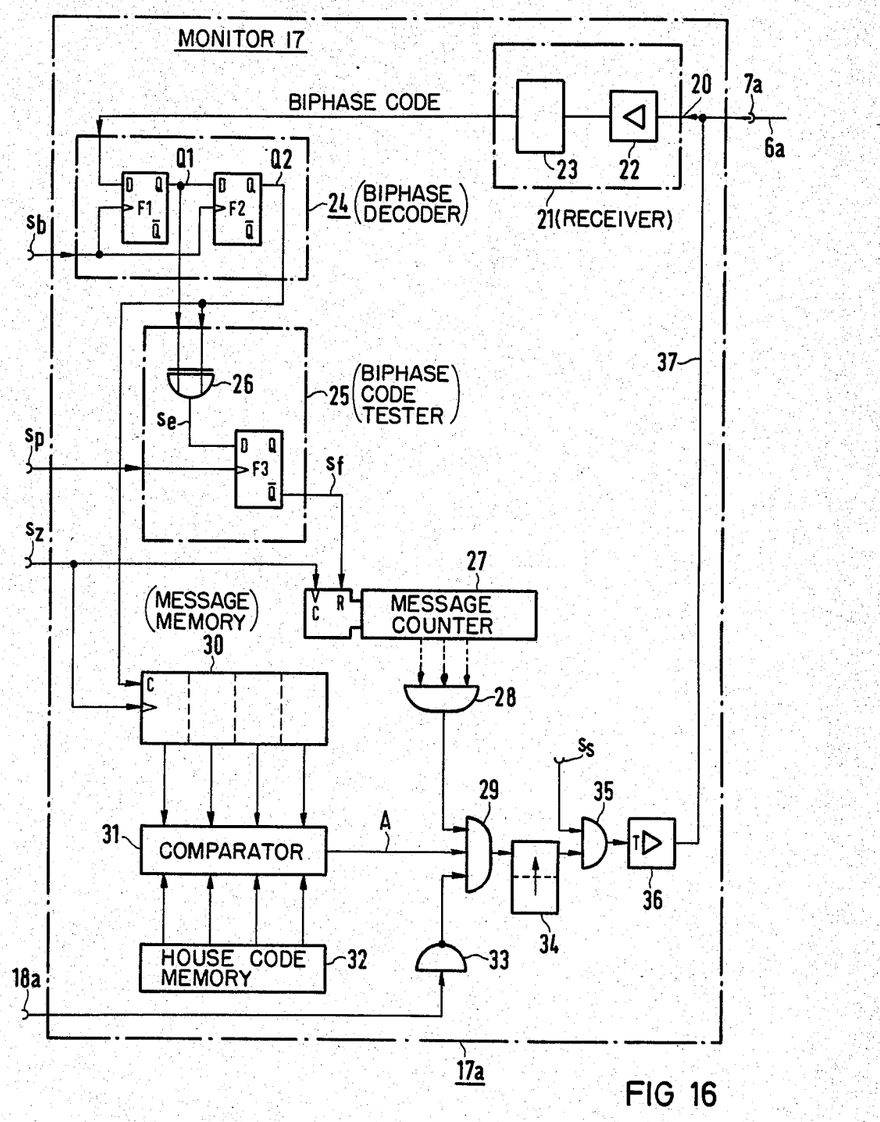
FIG. 16 is a schematic block diagram of the monitoring unit wherein the transmission of the individual information bits of a pulse message are bound in time to the zero passages of the power supply alternating current.
Figure 17:
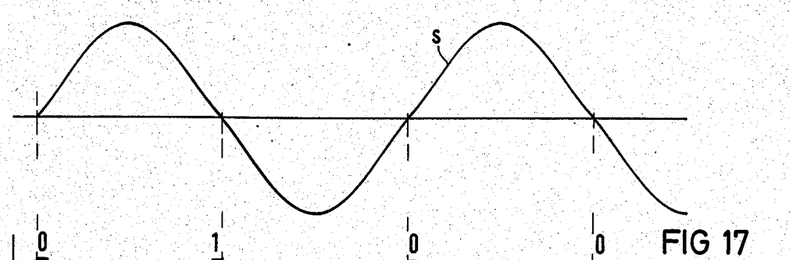
FIGS. 17 to 28 illustrate the associated signals sequences.

Since in the present instance the information message which is present on the electrical supply 6a installed in the apartment 3, which enters into the monitoring unit 17a through a receiving component 21 illustrated in FIG. 16, coincides with respect to the "house code" stored in the monitoring unit 17a, there is produced in a comparator device 30–32 in the monitoring unit 17a a signal at the end of the time interval $t_H$, as illustrated in FIG. 6, which corresponds to the designation "house code recognized".

Since the pulse message present in the electrical supply 6a of the apartment 3 coincides with to the "house code" of this apartment, there is presented the operating signal (FIG. 4) indicative of the active condition of the central station 12a, due to a conjunctive logic juncture of the negated operating signal with the signal "house code recognized", the output of the monitoring unit 17a remains inactive, so that no code altering signal will be conducted through the terminal box 7a into the installed wiring supply 6a, so that the incoming information message remains unchanged.

The case represented in the FIGS. 8 through 14 is quite different, in which a foreign information message, for example originating from a central station 12b of the apartment 4, enters into the installed power supply 6a of the apartment 3 without the associated central station 12a being active, whereby the information message with respect to the "house code" coincides with that utilized in the apartment 3.

Figure 8:
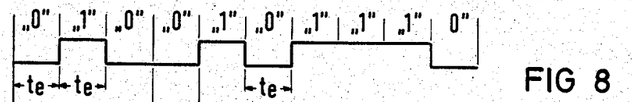
FIG. 8 through 14 illustrate, on the basis of pulse messages, the operating mode of the monitoring unit when an information message foreign to a neighboring system is introduced in transmission wiring of its own system.
Figure 9:
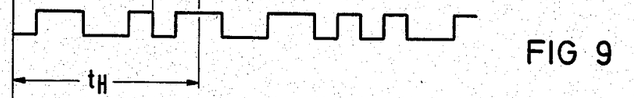

FIG. 8 illustrates this information message present in the apartment 3 on the installed wiring supply 6a in the nonredundant binary code, and FIG. 9 represent the information message in the biphase code. The information message illustrated in FIGS. 8 and 9 correspond with those illustrated in FIGS. 2 and 3. The carrier frequency, encompassing the information message shown in FIGS. 3 and 9, is not illustrated for purposes of clarity.

Figure 10:
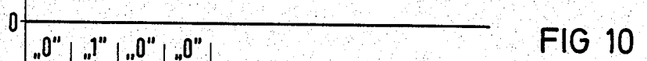
Figure 11:
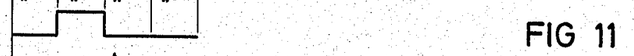

Since the central station 12a in the apartment 3, as already mentioned hereinabove, in the present example is not active, comparing FIG. 4 with respect to FIG. 10, the the central station 12a merely introduces a zero operating signal across the conductor 18a to the monitoring unit 17a.

FIG. 11 again represents the fixedly preselected "house code" in the memory of the monitoring unit 17a, which coincides with the "house code" component of the information message entering into the installed wiring supply 6a of the apartment 3 (FIG. 8).

Figure 12:
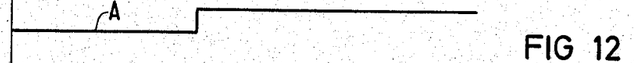
Figure 13:
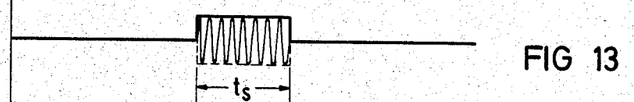
Figure 14:
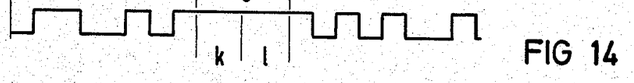

After the time interval $t_H$, which is determined by the duration of the "house code", there is generated in the monitoring unit 17a the signal represented in FIG. 12 which indicates "house code recognized". Through the conjunctive combination of the inverted operating signal (FIG. 10) with the signal "house code recognized" illustrated in FIG. 12, a trigger signal is generated which triggers the transmission component present in the monitoring bits 17a. This transmitting component emits thereupon a carrier frequency sinusoidal wave train of the duration $t_s$ which is coupled through the terminal box 7a into the wiring supply 6a installed into the apartment 3 and enters, through the electrical meter 5b, also into the electrical power supply 6b installed in the apartment 4. The sinusoidal wave train (burst) evidences, in the case of the exemplary embodiment, a duration of two information bits $t_e$ of the information message illustrated in FIG. 8 in a nonredundant binary code. This sinusoidal wave train is represented in FIG. 13. Through the superposition of the sinusoidal wave train upon the information message entering the installed supply 6a of the apartment, the information message is changed in its content. This message change, as illustrated in a simplified manner in FIG. 14, occurs at both time locations k and l connecting the "house code", and represents (in a simplified manner), a filling in of the pulse gaps presently representing the logic value "0" of the information message which is present in the biphase code, as can be ascertained from a comparison of FIGS. 9 and 14. There also occurs at the locations of the pulse already present in the biphase code at the time locations k and l a level increase through the superposition of the sinusoidal wave train emitted by the transmission stage which, however, is not shown in FIG. 14, and in a practical case can be taken care of without difficulty in the receiving components present in substations 13a through 16a. The information message now received in substations 13a through 16a evidences at the time locations k and l a code distortion in the biphase code, which leads to an immediate cessation of the evaluation of the incoming information message into these substations. Thus, the information message originating in the central station 12b of apartment 4, which is illustrated in FIG. 8, does not cause the triggering in apartment 3 of any switching or control functions.

Figure 15:
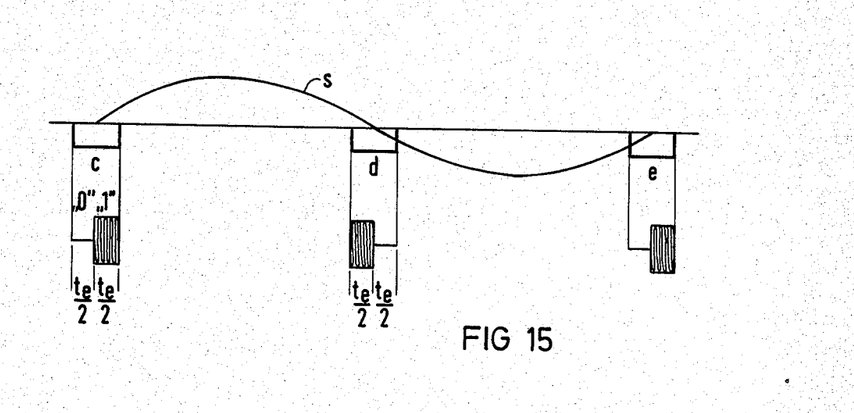
FIG. 15 illustrates the occurrence of the first three information bits of the information message when synchronized with the power supply frequency shown in FIG. 2 and 8 in a biphase code.

FIG. 15 shows, by way of example, a transmission of the information bit or unit of an information message in a biphase code synchronized with the zero passages of the alternating current voltage S for the first three information bits or units of the "house code" component of the information message illustrated in FIGS. 2 and 8. Through the zero passages of the alternating current voltage S, there are defined three time locations c, d and e, which presently centrally contain the zero passages of the alternating current voltage. Through the central station 12a, there is transmitted at the time location c the first information bit of the "house code" corresponding to the logic value of "0" in a biphase code logic value sequence "0"—"1", in which the logic value "0" is represented by the lack of a carrier frequency sinusoidal wave train during the first time span $t_e/2$, and the logic value "1" is represented by the occurrence of the carrier frequency sinusoidal wave train only during the first time span $t_e/2$. At the time location d during the subsequent zero passage of the alternating current voltage S, representing the logic value "1" of the second information bit of the "house code" component of the information message in the biphase code represented in FIGS. 2 and 8, is placed into the installed wiring 6a through the central station 12a. Hereby there is placed, during the first half $t_e/2$ of the time place d, a carrier frequency sinusoidal wave train into the installed wiring supply 6a, which during the subsequent second half $t_e/2$ of this time placed is followed by a transmission pause for the duration $t_e/2$ within the timeplace d. At the subsequent zero passage of the alternating voltage S there is quite analogously effected at the timeplace e the transmission of the subsequent information bit of the "house code" component with the logic value "0". Through the transmission of the information bits of an information message during the zero crossing passages of the alternating current voltage S, a simple synchronization is possible between the central station 12a and the associated substations 13a through 16a, whereby concurrently at these timepoints the impedance changes occasioned by the appliances contained in the apartment 3 are minimal. Hereby there are extensively avoided disruptions in the information transmission.

FIG. 16 illustrates the principal construction of a monitoring unit in the example of the monitoring unit 17a, whereby the transmission of the information bits of an information message is synchronized with the zero crossing passages of the alternating current supply S, as is illustrated in FIG. 15. The signal sequences which occur in the monitoring unit 17a are represented in FIGS. 17 through 28. Hereby, FIG. 17 again illustrates the alternating current voltage S, whose zero passages serve for the synchronization of the transmission of the individual information bits.

Figure 18:
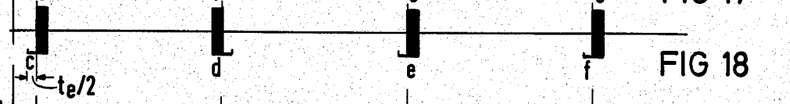
Figures 19, 20:
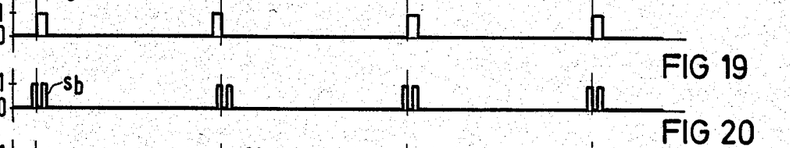

The monitoring unit 17a is connected to the terminal box 7a to the electrical supply 6a installed in the apartment 3. An information message which is present on this supply is conducted through the conductor 20 to the receiving component 21. The "house code" component at the four time positions c through f is illustrated in FIG. 18. Hereby, there is transmitted at the individual time locations c through f, in the biphase code, the logic sign sequence "0"—"1"—"0"—"0". The receiving component 21 contains a frequency selective receiver 22, which is correlated with the carrier frequency of the information message, as well as a demodulator 23 connected to the output thereof. At the output of the demodulator 23, which also forms the output of the receiving component 21, there stands available the demodulated information message in a biphase code, whose "house code" component is again represented in FIG. 19.

Figure 21:
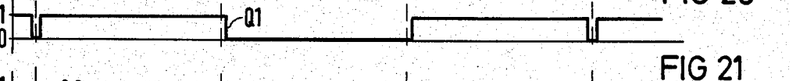
Figures 22, 23, 24:
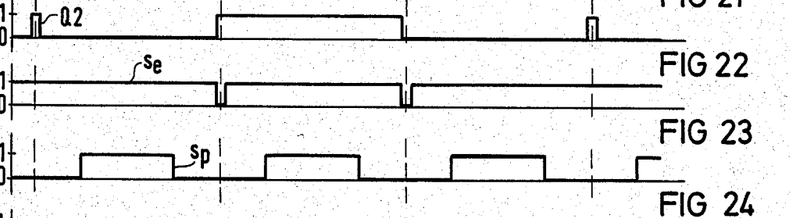

The information message is thereafter encoded in the biphase decoder 24. This biphase decoder 24 is constructed in this embodiment as a two-bit slide register, consisting of the D-flip flops F1 and F2. The D-input of the flip flop F1 forms the input of the biphase decoder 24. The output signal Q1 which is present at the noninverting output Q is conducted to the D input of the second flip flop F2, at whose noninverting output Q there is present the output signal Q2. The pulse inputs of both flip flops F1 and F2 are provided with the biphase pulse signal $s_b$ illustrated in FIG. 20. Biphase pulse signal $s_b$ consists of a double pulse for each zero transmission of the alternating current supply voltage, in which each of the individual pulses of each double pulse is shorter than the timespan $t_e/2$ and terminates with the end of each time span $t_e/2$. The output signals Q1 and Q2 of the biphase decoder 24 are illustrated in FIGS. 21 and 22. These signals Q1 and Q2 represent, independent from a synchronized region $t_e/2$ at the zero crossing passages of the alternating current voltage in a noninverted and inverted form, the "house code" component of an information message in a nonredundant binary code when in the incoming information message there is not present any code alteration of the biphase code. The synchronization of the two flip flops F1 and F2 is presently effected through the leading or increasing edge of the double pulse of the biphase pulse signal $s_b$. Due to the switching period of the flip flop F1, the second flip flop F2 presently assumes the output signal Q1 of the first flip flop F1, which is present in time ahead of the increasing edge of the biphase pulsing signal $s_b$ at the output Q of the first flip flop F1.

Figures 25, 26, 27:
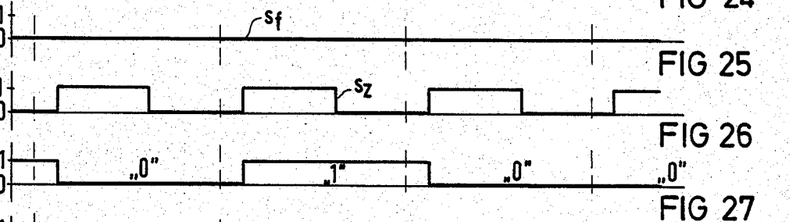

The output signals Q1 and Q2 of the biphase decoder 24 are conducted to a biphase code tester 25, namely to an exclusive OR gate 26 contained in the biphase code tester 25. The output signal $s_e$ of the exclusive OR gate 26 is conducted to the D input of a further D flip flop F3 which also is a part of the biphase code tester 25. This output signal $s_e$ is illustrated in FIG. 23. This output signal $s_e$ of the exclusive OR gate 26, insofar as the incoming pulse message is not subjected to a portion of the biphase code, is outside of a timespan of the duration $t_e/2$ of a signal at the zero crossing passage of the alternating current voltage with the logic value "1", as can be ascertained from FIG. 23. The pulse input of the further D-flip flop F3 has a test pulse signal $s_p$ conducted thereto which is illustrated in FIG. 24. This test pulse signal $s_p$ is a square-wave signal which oscillates between the logic values "0" and "1", the frequency of which corresponds to twice the supply frequency and which, in comparison with the zero passages of the alternating voltage S, evidences a phase displacement of $\phi/4$. It is only important, however, in this test pulse signal $s_p$ that it detects an assumption of the output signal $s_e$ of the exclusive OR gate 26 in the flip flop F3, when the switching sequences triggered through the double pulse of the biphase pulse signal $s_p$ are terminated in the biphase decoder 24. The signal $s_f$ of the flip flop F3 which is present at the inverting output Q is illustrated in FIG. 25 for the case in which the information message entering into the biphase decoder 24 is not subjected to an alteration of its biphase code. In this instance, the signal $s_f$ is a continual signal with the logic value "0".

The signal $s_f$ is conducted to the resetting input R of a message counter 27, whose count input C is the count pulse signal $s_z$. This count pulse signal $s_z$ is illustrated in FIG. 26. The signal $s_z$ is also a square-wave signal alternating between the logic values "0" and "1" at double the supply frequency, whose phase displacement in comparison with the zero crossing passages of the alternating current voltage S consists of $\phi/8$. Hereby, it is only important at the end of each of the exemplary illustrated time locations c,d,e, that there presently is increased for an information diagram the value of the message counter by one bit. The message counter 27 thus counts the number of information bits transmitted in biphase code, such that it is sufficient when its count capacity limits itself to the number of the information bits which correspond to the "house code" component of an information message, in effect, in the present instance to the number 4.

As long as the "house code" component of an information message does not evidence an alteration of its biphase code, the output signal $s_e$ of the exclusive OR gate 26 has the logic value "1". If in contrast therewith, there appears a code alteration, then the output signal $s_e$ assumes the logic value "0". In the first mentioned case, the output signal $s_f$ is at the inverting output Q of the flip flop F3 at the logic value "0", and in the last-mentioned case (code alteration) the output signal $s_f$ changes to the logic value "1". Such a signal change of the output signal $s_f$ from the logic value "0" to the logic value "1" acts as a resetting signal for the message counter 27. It is a prerequisite that the starting pulse preceding each actual information message is code altering to the biphase code; in effect, contains at one time place either a "double 0" (no transmission signal) or a "double 1" (continuous pulse for the entire duration of a time place $t_e$). This will cause that through the start pulse prior to the commencement of each actual information message, the message counter is reset to the value zero. When such a code alteration appears in the "house code" component of an information message, then the message counter is naturally reset again to the value zero.

The content of the message counter is continuously tested through an interrogating unit 28. This interrogating unit 28 can be constructed, for example, as an AND gate whose inputs are connected with the outputs of the storage stages of the message counter. When the content of the message counter 27 corresponds to the number of information bits (nonredundant) of the "house code" component of an information message; in effect, in the present instance the number 4, then this interrogating element 28 delivers an output signal with the significance "house code component without code alteration fully entered". The interrogating element 28 thus determines the count condition of the message counter 27 at the timepoint of which there has been entered a number of information bits corresponding to the length of the "house code" component. The output signal of the interrogating bit 28 is conducted to one input of an AND gate 29.

The output signal Q2 of the biphase decoder 24 is also conducted to the data input C of a message memory 30 belonging to the comparator device with the elements 30, 31, 32, whose pulse input is subjected to the count pulse signal $s_z$. The message memory 30 must evidence a number of memory cells or bits corresponding at least to the number of information bits of the "house code", in the present case thus 4. The outputs of the memory cells or bits of the message memory 30 are connected to the first inputs of an electronic comparator 31 which is associated with the comparator device. The other inputs of the comparator 31 are the outputs of the memory bits of the memory 32 connected thereto, which is constructed as a fixed value storage with an externally presettable storage content. Into this memory 32 there is introduced by the consumer the selected "house code" effective in the system for the apartment 3. In the present embodiment, the memory 32 thus contains the logic binary sequence "0"—"1"—"0"—"0". The electronic comparator 31 delivers at its output, at the coincidence with the "house code" component of an incoming information message with a "house code" found in the memory 32, the logic signal A having the significance "house code recognized", as is illustrated, for example, in FIGS. 6 and 12. The time sequence of an incoming information message and an applicable "house code" component into the message memory 30 is illustrated in FIG. 27.

The output signal of the electronic comparator 31 is conveyed as the second input to the AND gate 29, at whose third input there is present, originating across the conductor 18 from the central station 12a, the operating signal which has been inverted in an inverting stage 33. The output of the AND gate 29 is connected with the input of a monostable flip flop 34. This monostable flip flop 34 is set only then when the interrogating element signals the input of a number of correct information bits corresponding to the "house code" component, when additionally the incoming "house code" coincides with the "house code" programmed in the memory 32 and when, in addition thereto, its own central station 12a is not active; in essence, when the presently incoming information message with a fitting "house code" component originates from a foreign central station.

Figure 28:
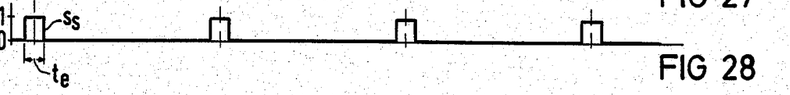

The duration of the unstable condition of the monostable flip flop 34 is measured so that it incorporates at least the end of the subsequent timeplace in the information message, in essence it encompasses at least one half-period of the alternating current voltage S. The output signal of the monostable flip flop 24, together with the transmitting time signal $s_s$ illustrated in FIG. 28, is conjunctively combined through an AND gate 35 coupled to the trigger input T of the transmitting component 36. The transmitting component 36 is connected through the output conductor 37 to the terminal box 7a of an electrical power supply installed in the apartment 3. The transmission time signal $s_s$ is present at least for the duration $t_e$ of a time place at the logic value "1", whereby the timespan $t_e$ lies for one-half ahead of the zero crossing passage of the alternating current voltage s and for one-half subsequent to the zero crossing passage of the alternating current voltage s. The transmitting component 36 is presently activated for the entire duration, whereas the transmission time signal $s_s$ inclusively activates the logic value "1". Hereby, the transmitting component 36 produces at the time place in the biphase code connecting the "house code" component of an information message a "double one" ("1"—"1"), in which a sinusoidal wave train is emitted having a carrier frequency of the minimum duration $t_e$. Appearing thereby in the information message in the biphase code at least at one location for the representation of an information unit in lieu of the exclusively permissible logic value sequences "0"—"1" or "1"—"0" is the logic value sequence "1"—"1" which is not permissible in the biphase code. The sinusoidal wave train which is emitted by the transmission bit 36 can naturally extend over a plurality of time spans $t_e$, presently provided for one time place, for presently one information bit. In the case illustrated in FIG. 13, in which the information bits of an information message are not transmitted in conjunction with the zero crossing passages of the alternating current voltage, but follow directly behind each other for the duration of the sinusoidal wave train $t_s$, there is selected the duration $2t_e$; in essence, the duration of two information bits (time places) of the information message in the nonredundant binary code. In each case, through the action of the monitoring unit 17a only when in the apartment 3 there is received a foreign information message, whose "house code" component coincides with the "house code" selected for the system present in the apartment 3, into the message portion of which subsequent to the "house code", there is introduced a code altering signal so that the substations 13a through 16a are immediately deactivated. These substations are also equipped with a biphase decoder and a biphase code tester as well as a message counter, whereby these bits can also be so constructed as has been described hereinabove.

Thereby, by means of the central station, there cannot be activated an identical system which is provided in a neighboring apartment, for example through the central station 12b of the system which is arranged in the apartment 4, no switching or control sequence can be triggered in the other apartment 3. The output signal of the monitoring unit 17a which causes a code alteration in the presently received information message, however does not remain limited in its effect on the electrical power supply 6 which is installed in the apartment 3, but also extends across the electrical supply conduit 1 into the electrical power supplies installed in the neighboring apartments, for example, into the electrical power supply 6b of the apartment 4 from which there should originate the foreign message from the central station 12b. When, by means of the action of the inhabitant of the apartment 4, the substations 13b through 16b are set at the same "house code" as the substations 13a through 16a located in the apartment 3 then, because of the monitoring unit 17a, the code alteration introduced into the information message, also the substations 13b through 16b in the apartment 4 will not respond to the information messages emitted by its own central station 12b so that, in this manner, the inhabitant of apartment 4 can determine that he is utilizing an already occupied house code.

What is claimed is:

1. In a house system for the transmission of information messages which are encoded in the form of digital signals, wherein a house code specific to the house system is selected adapted for the testing of each information bit, including a central station and a series of substations at which the information messages of the central stations are selectively transmittable through the electrical power supply as a transmission path which is utilized by further similar systems, wherein each substation terminates further information evaluation on the basis of an information bit recognized as erroneous, and wherein each information message includes a selectable subsequence of digital signals specific to the house system occurring at other than the end of the total sequence of digital signals representing the information message, the improvement comprising:

(a) said central station emitting an electrical operating signal during the duration of each information message emitted thereby;

(b) a monitoring unit for receiving the operation signal;

(c) said monitoring unit containing
 (aa) a receiving component for the information message connected to the transmission path;
 (bb) a memory having the subsequence of digital signals having the house code specific to the house system stored therein;
 (cc) a comparator means, coupled to said receiving component and said memory, within which there is analyzed the information message for the occurrence of the sequence of digital signals specific to the house system;
 (dd) and a transmitting component connected at its output to the transmission path and coupled at its input to said comparator means for emitting a signal on the transmission path effectuating a code alteration in the information message when in an incoming information message on the transmission path there occurs a subsequence of digital signals specific to the house system without the concurrent presence of the operation signal emitted by said central station.

2. System as claimed in claim 1, wherein the information message is transmitted as a digital signal modulating a carrier frequency.

3. System as claimed in claim 1, wherein a biphase code is selected as the code adapted for the testing of each information bit, in which there is repeated a logic value in inverted form associated with an information bit.

4. System as claimed in claim 3, wherein a digital signal forming a logic value is formed as a sinusoidal wave train.

5. System as claimed in claim 1, wherein the subsequence of digital signals specific to the house system is arranged at the beginning of the information message.

6. System as claimed in claim 2, wherein the receiving component includes a selective receiver correlated to the carrier frequency, and a demodulator.

7. System as claimed in claim 1, wherein each information bit of the information message is emitted in the region of a zero crossing passage of the power supply voltage.

8. System as claimed in claim 1, wherein the comparator means includes an electronic message memory for at least the subsequence of digital signals specific to the house system, having an input connected with the output of the demodulator, and wherein the output of the demodulator is connected with an input of an electronic comparator, the memory being connected to the second input of the comparator.

9. System as claimed in claim 8, wherein said message memory comprises a shift register.

10. System as claimed in claim 8, wherein the output signal of the comparator and the inverted operating signal are logically conjunctively interconnected in an AND gate in operative connection with the trigger input of the transmitting component which subsequent to the trigger at the timepoint of the occurrence of the subsequent information bit emits a sinusoidal wave train in the carrier frequency whose duration corresponds to at least the duration of an information bit in the biphase code.

11. System as claimed in claim 3, wherein a biphase decoder is connected to the output of the receiving component, whose output signal is transmitted to the input of the message memory.

12. System as claimed in claim 11, wherein said biphase decoder is formed of a two stage shift register consisting of two flip flops.

13. System as claimed in claim 11 including a biphase code tester having an input in operative connection with the biphase decoder and an output providing a resetting signal for a message counter coupled to the output of said biphase code tester upon the occurrence of a code alteration in the information message, wherein the message counter counts the input of a subsequence of digital signals specific to the applicable system, an interrogating unit coupled to the output of the message counter, said interrogating unit having an output signal active after the complete input of the subsequence of digital signals specific to the house system without code alteration, and wherein the output signal of the interrogating element in conjunction with the output signal of the comparator and the inverted operating signal are logically conjunctively interconnected in an AND gate.

14. System as claimed in claim 13, wherein a monostable flip flop is connected to the output of the AND gate wherein the unstable condition of the flip flop subsequent to the setting continues at least to the completion of the subsequent information bit in the information message.

15. A system as claimed in claim 7, wherein the output signal of the monostable flip flop is logically conjunctively interengaged in a further AND gate with a signal which is exclusively active in the region of the zero crossing passage of the power supply alternating current for the duration of an information bit, whereby the output signal of the further AND gate places the transmitting component into operation.

16. System as claimed in claim 2, wherein a biphase code is selected as the code adapted for the testing of each information bit, in which there is repeated a logic value in inverted form associated with an information bit.

17. System as claimed in claim 9, wherein the output signal of the comparator and the inverted operating signal are logically conjunctively interconnected in an AND gate in operative connection with the trigger input of the transmitting component which subsequent to the triggering at the timepoint of the occurrence of the subsequent information bit emits a sinusoidal wave train in the carrier frequency whose duration corresponds to at least the duration of an information bit in the biphase code.

18. System as claimed in claim 12, including a biphase code tester having an input in operative connection with the biphase decoder and an output providing a resetting signal for a message counter coupled to the output of said biphase code tester upon the occurrence of a code alteration in the information message, wherein the message counter counts the input of a subsequence of digital signals specific to the applicable system, an interrogating unit coupled to the output of the message counter, said interrogating unit having an output signal active after the complete input of the subsequence of digital signals specific to the house system without code alteration, and wherein the output signal of the interrogating element in conjunction with the output signal of the comparator and the inverted operating signal are logically conjunctively interconnected in an AND gate.

19. A system as claimed in claim 14, wherein the output signal of the monostable flip flop is logically conjunctively interengaged in a further AND gate with a signal which is exclusively active in the region of the zero crossing passage of the power supply alternating current for the duration of an information bit, whereby the output signal of the further AND gate places the transmitting component into operation.

* * * * *